(12) United States Patent
Curtis et al.

(10) Patent No.: US 11,155,060 B2
(45) Date of Patent: Oct. 26, 2021

(54) SLIDING ELEMENT FOR AN ENGINE

(71) Applicants: Mahle International GmbH, Stuttgart (DE); Mahle Engine Systems UK Ltd, Warwickshire (GB)

(72) Inventors: Ryan Curtis, Warwickshire (GB); Jennifer Harvey, Warwickshire (GB); Janette Johnson, Central Scotland (GB); Konstantinos Kalogiannis, Warwickshire (GB); Kayleigh McEwan, Coalville (GB)

(73) Assignees: Mahle International GmbH; Mahle Engine Systems UK Ltd

( * ) Notice: Subject to any disclaimer, the term of this patent is extended or adjusted under 35 U.S.C. 154(b) by 34 days.

(21) Appl. No.: 16/388,835

(22) Filed: Apr. 18, 2019

(65) Prior Publication Data
US 2019/0323557 A1   Oct. 24, 2019

(30) Foreign Application Priority Data

Apr. 19, 2018 (GB) .................................... 1806388

(51) Int. Cl.
*B32B 15/088* (2006.01)
*F16C 33/10* (2006.01)
*F16C 17/02* (2006.01)

(52) U.S. Cl.
CPC .......... *B32B 15/088* (2013.01); *F16C 17/02* (2013.01); *F16C 33/1095* (2013.01); *B32B 2250/03* (2013.01); *B32B 2264/10* (2013.01); *B32B 2307/746* (2013.01); *Y10T 428/24967* (2015.01)

(58) Field of Classification Search
CPC ......... B32B 15/088; F16C 33/201–206; F16C 33/1095; F16C 17/02
See application file for complete search history.

(56) References Cited

U.S. PATENT DOCUMENTS

| | | | |
|---|---|---|---|
| 6,548,453 | B1 | 4/2003 | Narasimhan et al. |
| 2008/0159671 | A1 | 7/2008 | Leonardelli |
| 2012/0101011 | A1 | 4/2012 | Makino et al. |

(Continued)

FOREIGN PATENT DOCUMENTS

| | | |
|---|---|---|
| EP | 2 157 135 A1 | 2/2010 |
| EP | 2 370 703 B1 | 8/2013 |

(Continued)

OTHER PUBLICATIONS

"(3-Aminopropyl)triethoxysilane Product Sheet". Sigma-Aldrich, retrieved Oct. 7, 2020; pp. 1-3.*

(Continued)

*Primary Examiner* — Prashant J Khatri
(74) *Attorney, Agent, or Firm* — Fishman Stewart PLLC

(57) ABSTRACT

A sliding element for an engine may include a metallic substrate, a first polymer-based layer, and a second polymer-based layer. The first polymer-based layer may include a polymeric material and may be disposed on the metallic substrate. The second polymer-based layer may include a polymeric material and may be disposed on the first polymer-based layer. The polymeric material of the first polymer-based layer may be the same as the polymeric material of the second polymer-based layer. The second polymer-based layer may further include a tungsten disulphide particulate.

16 Claims, 1 Drawing Sheet

(56) References Cited

U.S. PATENT DOCUMENTS

| | | |
|---|---|---|
| 2014/0233875 A1 | 8/2014 | Kobayakawa et al. |
| 2014/0329729 A1* | 11/2014 | Becker-Willinger .... C09D 7/61 508/106 |
| 2015/0125101 A1* | 5/2015 | Kachoosangi ........ F16C 33/043 384/129 |
| 2015/0166924 A1* | 6/2015 | Yamaguchi .......... C09D 133/24 508/128 |
| 2016/0312827 A1 | 10/2016 | Gorges et al. |
| 2017/0138396 A1 | 5/2017 | Latham et al. |
| 2018/0023619 A1 | 1/2018 | Takagi et al. |
| 2018/0051749 A1 | 2/2018 | Beaurepaire et al. |

FOREIGN PATENT DOCUMENTS

| | | |
|---|---|---|
| EP | 3 269 988 A1 | 1/2018 |
| WO | 2015/081363 A2 | 6/2015 |

OTHER PUBLICATIONS

German Search Report dated Sep. 12, 2019 related to corresponding German Patent Application No. DE 10 2019 110 337.1.

* cited by examiner

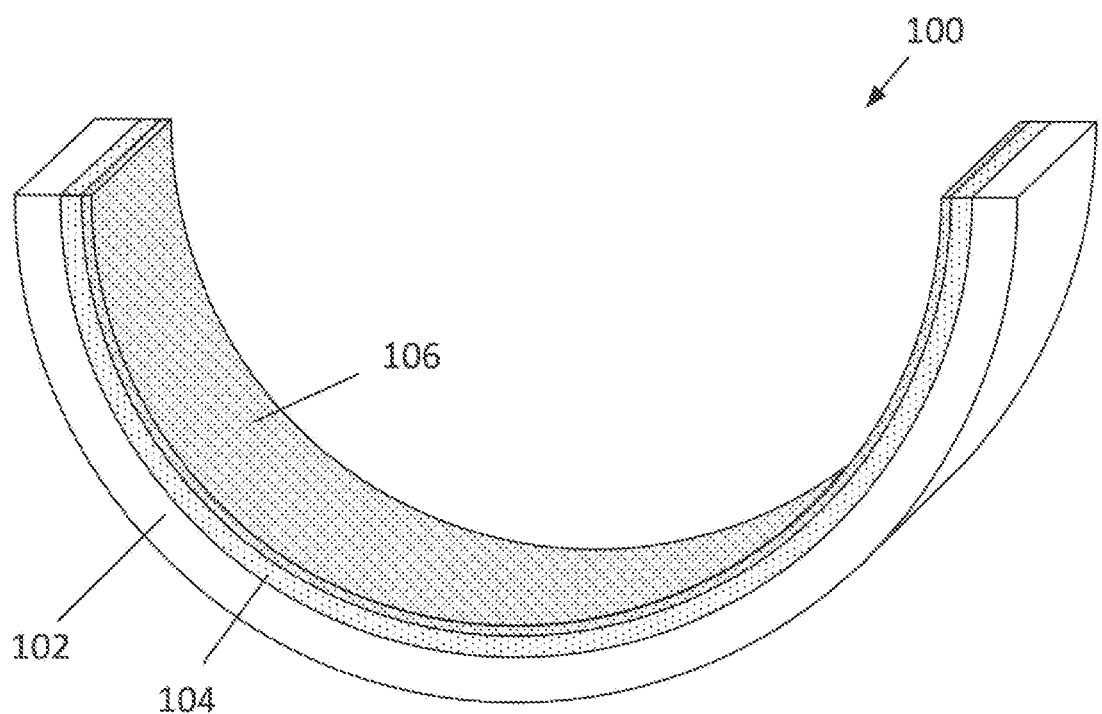

SLIDING ELEMENT FOR AN ENGINE

CROSS-REFERENCE TO RELATED APPLICATION

This application claims priority to Great Britain Application No. GB 1806388.3, filed on Apr. 19, 2018, the contents of which are hereby incorporated by reference in its entirety.

TECHNICAL FIELD

The present invention relates to a sliding element for an engine having a polymer-based overlay. The invention relates in particular to a sliding element for an engine having a polymer-based bearing material, wherein the polymer-based bearing material comprises a plurality of polymer-based layers.

Such sliding elements for an engine may include bearing lining shells, bushes, bearing surfaces of crankshafts, bearing surfaces of camshafts, bearing surfaces of connecting rods, thrust washers, bearing surfaces of a bearing block, bearing surfaces of a bearing cap, and piston assembly components such as piston rings, piston skirts, and cylinder walls and cylinder liners.

BACKGROUND

In internal combustion engines, the bearing assemblies typically each comprise a pair of half bearings retaining a crankshaft that is rotatable about an axis. Each half bearing is a hollow, generally semi-cylindrical, bearing shell, and typically at least one is a flange half bearing, in which the bearing shell is provided with a generally semi-annular thrust washer extending outwardly (radially) at each axial end. In other flanged bearing assemblies it is also known to use an annular or circular thrust washer.

The bearing surfaces of sliding bearings generally have a layered construction, in which a strong backing material is coated with one or more layers having preferred tribological properties, which provide the bearing surface that faces the cooperating moving part, in use. In known bearing shells, the substrate comprises a backing coated with a lining or intermediate layer, and the intermediate layer is in turn coated with an overlay formed from a bearing material. The overlay is typically 6 to 25 µm thick and may be formed of a polymer-based composite layer or a metal-alloy layer (e.g. a tin-based alloy overlay).

The function of the overlay is to provide a relatively soft, conformable layer that can accommodate small misalignments between the harder steel crankshaft journal and the bearing shells, and receive and embed dirt particles that may circulate in the oil supply and enter the bearing, so as to prevent damage to or scoring of the journal. These functions of the overlay are respectively termed conformability and embedability.

It is generally known that wear of the bearing material, or overlay, can lead to exposure of the lining layer to which the overlay material is applied. This can lead to failure of the sliding component due to seizure. There is therefore a need to provide bearings with increased wear resistance.

Polymer-based bearing materials have become popular for use as overlays in recent years, and research into sliding components has resulted in a wide range of compositions of polymeric bearing materials. Such bearing materials can improve the wear and fatigue properties of the bearing.

For example, EP 2 370 703 B1 describes polymer-based bearing material comprising a polyimide/amide plastics polymer matrix, with aluminium powder and a fluoropolymer distributed throughout the matrix.

With the advent of stop start engines and trends towards engine downsizing, engine bearings, in particular conrod and main bearings, are expected to perform under increasingly severe environments. The increased number of stop-start cycles, in which oil films are depleted, means that the frictional properties of the bearing overlay and the overlay lifetime are key to bearing performance.

Accordingly, there is a need to provide bearing materials which exhibit favourable friction properties as well as exhibiting favourable wear and fatigue properties.

SUMMARY

According to a first aspect of the present invention, there is provided a sliding element for an engine. The sliding element comprises a metallic substrate, a first polymer-based layer comprising a polymeric material and provided on the metallic substrate, and a second polymer-based layer comprising a polymeric material and provided on the first polymer-based layer. The polymeric material of the first polymer-based layer is the same as the polymeric material of the second polymer-based layer. The second polymer-based layer further comprises tungsten disulphide particulate.

It has been found that the provision of the first polymer-based layer improves the wear and fatigue properties of the sliding element while the provision of the overlying second polymer-based layer advantageously improves the friction properties of the sliding element. In particular, it has been found that the provision of a second polymer-based layer comprising tungsten disulphide particulate lowers the coefficient of friction of the surface of the sliding element, or bearing surface, since the tungsten disulphide particulate acts as a solid lubricant. The incorporation of tungsten disulphide particulate in the second polymer-based layer may thus improve running-in behaviour, torque-to-turn tests and bearing lifetimes. By improving the coefficient of friction of the bearings in an engine, sliding elements according to the present invention may exhibit improved engine efficiency and reduced emissions.

Furthermore, the provision of the polymeric material of the first polymer-based layer being the same as the polymeric material of the second polymer-based layer may provide advantages. Firstly, the second polymer-based layer may advantageously be readily bonded to the first polymer-based layer since they are formed from the same polymeric material. This may be as a result of cross-linking of the polymeric materials of the two polymer-based layers. Advantageously, this may allow the second polymer-based layer to be bonded to the first polymer-based layer without the need for an adhesive. Secondly, the first and second polymer-based layers may advantageously be cured in a single curing step. This may reduce the number of steps required to manufacture the sliding element and reduce the associated lead time and cost.

The first polymer-based layer and the second polymer-based layer may together form a bearing material. The arrangement of the layers is such that the first polymer-based layer is disposed between the metallic substrate and the second polymer-based layer.

The metallic substrate preferably comprises a strong metal to give the bearing element structural rigidity. Suitable metallic substrate materials include: steel, aluminium, bronze, brass, bismuth, copper, nickel, tin, zinc, silver, gold and iron, or alloys of such materials. The metallic substrate may comprise a combination of two or more such materials or alloys. Particularly suitable substrate materials for bearing elements embodying the present invention include steel, iron, aluminium, copper alloy, bronze, and brass alloys.

Optionally, the first polymer-based layer may not comprise tungsten disulphide particulate. For example, in some embodiments, only the second polymer-based layer comprises tungsten disulphide particulate. Where this is the case, the two polymer-based layers may be distinguished since the first polymer-based layer does not comprise tungsten disulphide particulate and the second polymer-based layer comprises tungsten disulphide particulate. This may permit simple visual identification of sliding elements in which the second layer contains tungsten disulphide particulate. Furthermore, as set out below, the first polymer-based layer may further comprise additional components which are not present in the second polymer-based layer. Where this is the case, these additional components may further distinguish the two polymer-based layers.

The first polymer-based layer and the second polymer-based layer may be substantially parallel (e.g. for a generally flat sliding element). The first polymer-based layer and the second polymer-based layer may be generally concentric (e.g. for a curved sliding element such as a half bearing). The first polymer-based layer and the second polymer-based layer may have other formations, provided they form a layered structure. Each layer may have a substantially constant or consistent thickness.

The modulus of elasticity of the polymeric material of the first polymer-based layer may be the same as the modulus of elasticity of the polymeric material of the second polymer-based layer.

As used herein, the term "modulus of elasticity" is used to mean the stress applied to a material divided by the strain caused by the stress.

The provision that the modulus of elasticity of the polymeric material of the first polymer-based layer is the same as the modulus of elasticity of the polymeric material of the second polymer-based layer means the first and second polymer-based layers are likely to deform in substantially the same way when under stress. This advantageously may make the behaviour of the sliding element more predictable. This may also advantageously help to prevent the first polymer-based layer from becoming separated from the second polymer-based layer in use of the sliding element.

The polymeric material of the first and second polymer-based layers may be any polymeric material. Examples of suitable polymeric materials include or may comprise: cross-linkable bonding agents; thermosetting plastics; high melting point thermoplastics; materials having a matrix of at least one high melting point thermoplastic material; fibre-reinforced plastics; any combination of these materials. Other suitable materials are envisaged and will be readily apparent to the skilled person. Particularly suitable polymeric materials include: polyamide imide; PI (polyimide); epoxy; epoxy resin; acrylate resin; polyurethane, fluoropolymer, polyetheretherketone, formaldehyde resin, PBI (Polybenzimideazole); phenolic resin; silicone resin; or a combination of any of these materials. These materials are characterised by high temperature resistance and excellent media resistance (such as chemical resistance to lubricants).

Preferably the polymeric material of the first polymer-based layer and the polymeric material of the second polymer-based layer comprises polyamide-imide.

The second polymer-based layer may comprise any desired amount of tungsten disulphide particulate. Preferably, the second polymer-based layer comprises no more than about 70 wt % tungsten disulphide particulate. It has been found that sliding elements according to preferred embodiments of the present invention in which the second polymer-based layer comprises more than about 70 wt % tungsten disulphide particulate exhibit excessive mass loss and thickness loss when subjected to wear tests. The wear tests were carried out using a test rig in which a single half bearing was arranged facing upwardly, and an electrically-driven revolving eccentric test journal was loaded downwardly into the half bearing. The bearing was lubricated by a spray bar located above the leading side of the bearing clearance. The wear tests are described in further detail in the applicant's copending US application, U.S. 2018/0051749 A1. In the wear tests, the sliding element samples are subjected to a constant wear for a set period of time, after which the mass loss and thickness loss may be measured. It is thought that in this case, following the wear tests, the second polymer-based layer is substantially removed. Without wishing to be bound by theory, it is thought that while the tungsten disulphide particulate decreases the coefficient of friction of the sliding element, it also makes the second polymer-based layer softer thereby reducing the wear properties of the second polymer-based layer.

As used herein, the term "mass loss" refers to the difference in the total mass of a sliding element before and after the sliding element is subjected to a wear test.

As used herein, the term "thickness loss" refers to the difference in the wall thickness of the sliding element, including the metallic substrate and any polymer-based layer, before and after a wear test is conducted on the sliding element.

As used herein, quantities of components described in weight percentages (wt %) refer to the weight percent of the components in the final cured coating on the sliding element, i.e. when the any solvent has been removed and the polymeric material has cured.

The second polymer-based layer may advantageously comprise no more than about 50 wt % tungsten disulphide particulate. Sliding element samples comprising about 50 wt % tungsten disulphide particulate exhibit less than half the mass loss and thickness loss exhibited by sliding element samples comprising about 70 wt % tungsten disulphide particulate.

The second polymer-based layer may advantageously comprise no more than about 30 wt % tungsten disulphide particulate. Sliding element samples comprising about 30 wt % tungsten disulphide particulate exhibit less than half the mass loss and thickness loss exhibited by sliding element samples comprising about 50 wt % tungsten disulphide particulate.

The second polymer-based layer may comprise at least about 15 wt % tungsten disulphide particulate. Sliding elements according to preferred embodiments of the present invention comprising a second polymer-based layer comprising less than about 15 wt % tungsten disulphide particulate may not exhibit a sufficient decrease in coefficient of friction compared to sliding elements not comprising tungsten disulphide. The second polymer-based layer may comprise at least about 20 wt % tungsten disulphide particulate, or at least about 25 wt % tungsten disulphide particulate.

The second polymer-based layer may preferably comprise between about 15 wt % and about 70 wt %, or between about 20 wt % and about 50 wt %, or between about 25 wt % and about 35 wt %, or between about 25 wt % and about 30 wt % tungsten disulphide particulate. The second polymer-based layer may preferably comprise about 30 wt % tungsten disulphide particulate.

The tungsten disulphide particulate may comprise particles having any size. Preferably, the tungsten disulphide particulate comprises particles having a length of less than about 10 μm in a longest dimension. This may advantageously prevent the formation of agglomerations of tungsten disulphide particulate and promote an even dispersion of the tungsten disulphide particulate throughout the second polymer-based layer. This provision may also advantageously prevent the tungsten disulphide particulate from forming agglomerations and sinking during any mixing step prior to application.

The tungsten disulphide particulate may advantageously comprise particles having a length of less than about 20 μm in a longest dimension. For example, less than about 5 μm in a longest dimension.

The tungsten disulphide particulate may also advantageously comprise particles having a length of at least about 3 μm in a longest dimension.

The tungsten disulphide particulate may advantageously comprise particles having a length of between about 3 μm and about 20 μm in the longest dimension.

In an embodiment of the sliding element intended for use as an automotive engine bearing, the tungsten disulphide particulate preferably comprises particles having a length of less than about 1 μm along a shortest dimension i.e. a dimension along a length that is perpendicular to a longest dimension. This advantageously allows the second polymer-based layer to be kept very thin while avoiding the tungsten disulphide particulate, which tends to settle with the particles orientated so that their longest dimension is substantially parallel to the substrate, projecting from the second polymer-based layer.

The tungsten disulphide particulate may advantageously comprise particles having a length of at least about 0.25 μm in a dimension perpendicular to a longest dimension.

The tungsten disulphide particulate may comprise particles having any shape. Preferably, the tungsten disulphide particulate comprises tungsten disulphide flakes.

The second polymer-based layer may have any desired thickness relative to the first polymer-based layer. For example, the second polymer-based layer may have a thickness that is greater than a thickness of the first polymer-based layer. Preferably, the second polymer-based layer has a thickness which is less than a thickness of the first polymer-based layer.

It has been found that where the second polymer-based layer has a thickness that is greater than the thickness of the first polymer-based layer, the advantageous properties of the first polymer-based layer are less pronounced. It is therefore desirable that the second polymer-based layer has a thickness which is less than a thickness of the first polymer-based layer.

The second polymer-based layer may have any desired thickness. In an embodiment of the sliding element intended for use as an automotive engine bearing, the second polymer-based layer may have a thickness of less than about 6 μm. Preferably, the second polymer-based layer may have a thickness of less than about 4 μm. Preferably, the second polymer-based layer may have a thickness of more than about 2 μm. Alternatively, the second polymer-based layer may have a thickness of more than about 4 μm. For example, the second polymer-based layer may have a thickness of between about 2 μm and about 4 μm, or between about 4 μm and about 6 μm.

The first polymer-based layer may have any desired thickness. In an embodiment of the sliding element intended for use as an automotive engine bearing, the first polymer-based layer may have a thickness of less than about 9 μm. Preferably, the first polymer-based layer may have a thickness of less than about 7 μm. Preferably, the first polymer-based layer may have a thickness of more than about 4 μm. Alternatively, the first polymer-based layer may have a thickness of more than about 6 μm. For example, the first polymer-based layer may have a thickness of between about 4 μm and about 6 μm, or between about 6 μm and about 8 μm.

In an embodiment of the sliding element intended for use as an automotive engine bearing, the combined thickness of the first and the second polymer-based layers may be between about 8 μm and about 12 μm.

A thickness of the first polymer-based layer may be substantially constant over the first polymer-based layer. A thickness of the second polymer-based layer may be substantially constant over the second polymer-based layer. This may form a layered configuration. A thickness of the first polymer-based layer may be substantially the same as, or different to, a thickness of the second polymer-based layer.

The second polymer-based layer may further comprise one or more additional components. For example, the second polymer-based layer may further comprise a dispersion additive. A preferred dispersion additive comprises a phosphoric acid ester.

Preferably, the second polymer-based layer comprises tungsten disulphide particulate as the only solid lubricant, such that the second polymer-based layer does not contain other solid lubricants.

Alternatively, the second polymer-based layer may further comprise one or more additional solid lubricants such as graphite, molybdenum disulfide, or PTFE.

The first polymer-based layer may further comprise one or more additional components. For example, the first polymer-based layer may comprise aluminium particulate. The provision of aluminium particulate in the first polymer-based layer may improve the wear resistance of the sliding element. The aluminium particulate may have any desired shape. Preferably, the aluminium particulate comprises particles in the form of flakes.

The first polymer-based layer may comprise any desired amount of aluminium particulate. Preferably, the first polymer-based layer may comprise between about 20 wt % and about 30 wt % aluminium particulate, preferably between about 24 wt % and about 28 wt % aluminium particulate.

The first polymer-based layer may further comprise one or more solid lubricants. For example, the first polymer-based layer may comprise a fluoropolymer. Suitable fluoropolymers include polytetrafluoroethylene (PTFE) and fluorinated ethylene-propylene (FEP). Preferably the solid lubricant comprises PTFE since this has been found to be effective in reducing the friction coefficient of the sliding element. The first polymer-based layer may comprise between about 5 wt % and about 15 wt % solid lubricant, preferably between about 8 wt % and about 12 wt % solid lubricant.

The first polymer-based layer may further comprise a silane material. Silane materials may promote stability of the polymeric material and may also promote adhesion of the first polymer-based layer to the substrate. The first polymer-based layer may comprise between about 2 wt % and about 8 wt % of a silane material. Preferably, the first polymer-based layer may comprise between about 4 wt % and about 6 wt % of a silane material.

EP 2 370 703 B1 describes a bearing material which may be used as the first polymer-based layer of the present invention. Further details and properties of the first polymer-based layer may therefore be found in EP 2 370 703 B1.

In a second aspect of the present invention, there is provided an engine comprising a sliding element according to the first aspect of the invention.

In a third aspect of the present invention, there is provided a method of producing a sliding element for an engine. The method comprises steps of: applying a first polymer-based layer, comprising a polymeric material, to a metallic substrate, and applying a second polymer-based layer, comprising a polymeric material, to the first polymer-based layer. The polymeric material of the first polymer-based layer is the same as the polymeric material of the second polymer-based layer. The second polymer-based layer further comprises tungsten disulphide particulate.

Prior to the application steps, the constituents for the first polymer-based layer may be combined with a solvent which may facilitate forming a first mixture. The first mixture may then be applied to the metallic substrate.

Prior to the application steps, the constituents for the second polymer-based layer may be combined to form a second mixture. The second mixture may then be applied to the first polymer-based layer.

At least one of the first and second mixtures may further comprise a solvent. The amount of solvent used may be selected to provide a mixture having an appropriate viscosity for the application step. For example, the viscosity of the first or second mixture may be adjusted so as to achieve an appropriate viscosity for spraying or screen printing. At least one of the first and second mixtures may further comprise thinners which may be used to further control the viscosity of the mixture.

The first and second polymer-based layers may be applied using any suitable technique. The first and second polymer-based layers may be applied by a spraying method. For example, where the constituents of the first polymer-based layers are combined with a solvent to form a first mixture, the first mixture may be sprayed onto the metallic substrate. Where the constituents of the second polymer-based layer are combined with a solvent to form a second mixture, the second mixture may be sprayed onto the first polymer-based layer. At least one of the first and second polymer-based layers may be applied using screen printing of the first or second mixtures.

The method may further comprise at least one drying step in which the solvent is removed from the applied layers by heating the applied layers. There may be a drying step between the application of the first polymer-based layer and the application of the second polymer-based layer.

The method may further comprise at least one curing step in which the polymeric material of at least one of the first and second polymer-based layers are cured. The at least one curing step may comprise a thermal curing, for example involving baking the sliding element in an oven or irradiating the sliding element with infrared radiation. The at least one curing step may comprise a non-thermal curing, for example involving exposing the sliding element to ultraviolet light. The at least one curing step may take between about 2 mins and about 2.5 hours. For example, the at least one curing step may take about 2 hours.

The steps of applying the first polymer-based layer and applying the second polymer-based layer may be two distinct application steps. This may help ensure there is a distinction between the two layers.

The step of applying the first polymer-based layer may be performed in a single pass. Alternatively, the step of applying the first polymer-based layer may be performed in more than one pass. For example, the step of applying the first polymer-based layer may comprise between about 1 and about 6 passes. Each pass may include steps of: applying a layer of a mixture to the metallic substrate; drying the layer of mixture; and curing the layer of mixture to form a first polymer-based layer. Optionally, each pass does not include a curing step. This advantageously allows a single curing step to be used to cure both the first polymer-based layer and the second polymer-based layer.

The step of applying the second polymer-based layer may be performed in a single pass. Alternatively, the step of applying the second polymer-based layer may be performed in more than one pass. For example, the step of applying the second polymer-based layer may comprise between about 1 and about 4 passes. Each pass may include steps of: applying a layer of a mixture to the first polymer-based layer; drying the layer of mixture; and curing the layer of mixture to form a second polymer-based layer. Optionally, each pass does not include a curing step. This advantageously allows a single curing step to be used to cure both the first polymer-based layer and the second polymer-based layer.

Application of the second polymer-based layer may take place before the first polymer-based layer is cured. The method may therefore comprise a single curing step in which both the first polymer-based layer and the second polymer-based layer are cured simultaneously.

It should be appreciated that any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

BRIEF DESCRIPTION OF THE DRAWINGS

The invention will further be described by way of example only with reference to the accompanying drawing, in which:

FIGURE shows a perspective view of a sliding element according to preferred embodiments of the present invention.

The FIGURE provided herein is schematic and not to scale.

DETAILED DESCRIPTION

FIGURE schematically illustrates a sliding element for an engine in the form of a hollow semi-cylindrical bearing lining shell (commonly referred to as a "half bearing") according to a preferred embodiment of the present invention. Many alternative shapes and configurations of the bearing element are envisaged and will be readily apparent to the skilled person.

The sliding bearing 100 comprises a metallic substrate 102 formed from steel or aluminium. The sliding bearing 100 further comprises a first polymer-based layer 104 provided on the metallic substrate 102. The first polymer-based layer 104 comprises a polymeric material. The sliding bearing 100 further comprises a second polymer-based layer 106 provided on the first polymer-based layer 104. The second polymer-based layer 106 comprises a polymeric material. The polymeric material of the first polymer-based layer 104 is the same as the polymeric material of the second polymer-based layer 106. The modulus of elasticity of the polymeric material of the first polymer-based layer 104 is the same as the modulus of elasticity of the polymeric material of the second polymer-based layer 106. The polymeric material of the first polymer-based layer 104 and the polymeric material of the second polymer-based layer 106 comprises polyamide-imide.

The second polymer-based layer 106 further comprises tungsten disulphide particulate in the form of tungsten disulphide flakes. The tungsten disulphide particulate comprises particles which have a length of less than 10 µm in a longest dimension and less than 1 µm in a dimension perpendicular to a longest dimension. The second polymer-based layer 106 comprises between about 20 wt % and about 30 wt % tungsten disulphide particulate. The second polymer-based layer 106 further comprises phosphoric acid ester as a dispersion additive.

The first polymer-based layer 104 further comprises between about 24 wt % and about 28 wt % aluminium particulate in the form of aluminium flakes, between about 8 wt % and about 12 wt % PTFE as a solid lubricant, and between about 4 wt % and about 6 wt % silane. The remaining wt % of the layer is the polyamide-imide.

The second polymer-based layer 106 has a thickness of between about 4 µm and about 6 µm. The first polymer-based layer 104 has a thickness of between about 6 µm and about 8 µm. The remaining wt % of the layer is the polyamide-imide.

The sliding element described above may be formed according to the following method. The components of the first polymer-based layer are mixed and combined with a solvent to form a first mixture. The components of the second polymer-based layer are mixed and combined with a solvent to form a second mixture. The first mixture is sprayed onto the surface of the metallic substrate in a series of passes until the desired thickness is reached to form a first polymer-based layer. The formation of the first polymer-based layer may take between about 1 and about 6 passes. The first mixture is dried between each pass but it is not cured. The second mixture is sprayed onto the first polymer-based layer to form a second polymer-based layer. The second polymer mixture is sprayed onto the first polymer-based layer in a series of passes. The formation of the second polymer-based layer may take between about 1 and about 4 passes. The second mixture is dried between each pass but it is not cured. Once the desired thickness of the second polymer-based layer is reached, both the first and second polymer-based layers are cured by heating the sliding element.

Although illustrated in FIGURE in relation to a half bearing shell, the present invention equally applies to other sliding engine components, including semi-annular, annular or circular thrust washers, and bushes. The mechanical performance enhancing additives (e.g. dry lubricant particulate, silane and metal particulate) dispersed within the polymer-based matrix provide significant enhancements to the mechanical performance of the sliding engine component, such as wear resistance, adhesion promotion, fatigue resistance, and frictional properties.

The invention claimed is:

1. A sliding element for an engine, comprising:
   a metallic substrate;
   a first polymer-based layer including a polymeric material disposed on the metallic substrate; and
   a second polymer-based layer including a polymeric material disposed on the first polymer-based layer;
   wherein the polymeric material of the first polymer-based layer is the same as the polymeric material of the second polymer-based layer;
   wherein the second polymer-based layer further includes a tungsten disulphide particulate;
   wherein the tungsten disulphide particulate is a plurality of tungsten disulphide flakes; and
   wherein the first polymer-based layer includes 24-28 wt % aluminium particulate, 8-12 wt % polytetrafluoroethylene (PTFE), and 4-6 wt % silane.

2. The sliding element according to claim 1, wherein the polymeric material of the first polymer-based layer and the polymeric material of the second polymer-based layer include polyamide-imide.

3. The sliding element according to claim 1, wherein the second polymer-based layer is composed of 15 wt % to 70 wt % tungsten disulphide particulate.

4. The sliding element according to claim 1, wherein:
   the plurality of tungsten disulphide flakes is the only solid lubricant present in the second polymer-based layer.

5. The sliding element according to claim 1, wherein the plurality of tungsten disulphide flakes have a length of 10 µm or less along a longest dimension.

6. The sliding element according to claim 5, wherein the plurality of tungsten disulphide flakes have a length of 1 µm or less along a dimension extending perpendicular to the longest dimension.

7. The sliding element according to claim 1, wherein:
   the second polymer-based layer has a thickness which is less than a thickness of the first polymer-based layer;
   the first polymer-based layer has a thickness of 9 µm or less; and
   the second polymer-based layer has a thickness of 6 µm or less.

8. The sliding element according to claim 1, wherein the second polymer-based layer further includes a dispersion additive.

9. The sliding element according to claim 1, wherein the plurality of tungsten disulphide flakes are evenly distributed throughout the second polymer-based layer.

10. An engine comprising a sliding element, the sliding element including:
    a metallic substrate;

a first polymer-based layer including a polymeric material disposed on the metallic substrate; and a second polymer-based layer including a polymeric material disposed on the first polymer-based layer;

wherein the polymeric material of the first polymer-based layer is the same as the polymeric material of the second polymer-based layer;

wherein the second polymer-based layer further includes a tungsten disulphide particulate;

wherein the tungsten disulphide particulate is a plurality of tungsten disulphide flakes; and wherein the first polymer-based layer includes 24-28 wt % aluminium particulate, 8-12 wt % polytetrafluoroethylene (PTFE), and 4-6 wt % silane.

11. The engine according to claim 10, wherein the plurality of tungsten disulphide flakes is the only solid lubricant present in the second polymer-based layer.

12. A method of manufacturing a sliding element for an engine, the method comprising:

applying a first polymer-based layer including a polymeric material to a metallic substrate; and applying a second polymer-based layer including a polymeric material to the first polymer-based layer;

wherein the polymeric material of the first polymer-based layer is the same as the polymeric material of the second polymer-based layer;

wherein the second polymer-based layer further includes a tungsten disulphide particulate;

wherein the tungsten disulphide particulate is a plurality of tungsten disulphide flakes; and wherein the first polymer-based layer includes 24-28 wt % aluminium particulate, 8-12 wt % polytetrafluoroethylene (PTFE), and 4-6 wt % silane.

13. The method according to claim 12, wherein applying the first polymer-based layer and applying the second polymer-based layer are two distinct application steps.

14. The method according to claim 12, further comprising curing the first polymer-based layer and the second polymer-based layer.

15. The method according to claim 14, wherein curing the first polymer-based layer and the second polymer-based layer occurs in a single step.

16. The method according to claim 12, further comprising:

forming a first mixture via mixing components of the first polymer-based layer with a solvent; and forming a second mixture via mixing components of the second polymer-based layer with a solvent;

wherein applying the first polymer-based layer includes disposing the first mixture on the metallic substrate; and wherein applying the second polymer-based layer includes disposing the second mixture on the first polymer-based layer.

* * * * *